(12) United States Patent
Park

(10) Patent No.: US 9,617,807 B2
(45) Date of Patent: Apr. 11, 2017

(54) CHAIN SERVICE INDICATOR

(71) Applicant: PREMIER COIL SOLUTIONS, INC., Waller, TX (US)

(72) Inventor: Do Seo Park, Houston, TX (US)

(73) Assignee: Premier Coil Solutions, Inc., Waller, TX (US)

( * ) Notice: Subject to any disclaimer, the term of this patent is extended or adjusted under 35 U.S.C. 154(b) by 426 days.

(21) Appl. No.: 14/274,150

(22) Filed: May 9, 2014

(65) Prior Publication Data

US 2014/0332237 A1 Nov. 13, 2014

Related U.S. Application Data

(60) Provisional application No. 61/821,439, filed on May 9, 2013.

(51) Int. Cl.
| | |
|---|---|
| E21B 19/22 | (2006.01) |
| F16H 7/08 | (2006.01) |
| B65G 23/44 | (2006.01) |
| F16H 7/12 | (2006.01) |
| G01M 13/02 | (2006.01) |

(52) U.S. Cl.
CPC .............. *E21B 19/22* (2013.01); *B65G 23/44* (2013.01); *F16H 7/1263* (2013.01); *G01M 13/023* (2013.01)

(58) Field of Classification Search
CPC ....... E21B 19/22; B65G 23/44; F16H 7/1263; G01M 13/023
See application file for complete search history.

(56) References Cited

U.S. PATENT DOCUMENTS

| | | | | | |
|---|---|---|---|---|---|
| 4,457,564 | A | * | 7/1984 | Ruge ...................... | B62D 55/30 305/145 |
| 5,188,174 | A | * | 2/1993 | Anderson, Jr. ......... | E21B 19/22 166/77.3 |
| 5,553,668 | A | * | 9/1996 | Council .................. | E21B 19/22 166/77.3 |
| 5,850,874 | A | * | 12/1998 | Burge .................... | B65H 75/22 166/77.3 |
| 5,918,671 | A | * | 7/1999 | Bridges .................. | E21B 19/22 166/77.3 |
| 6,209,634 | B1 | * | 4/2001 | Avakov .................. | E21B 19/22 166/77.3 |
| 6,216,780 | B1 | * | 4/2001 | Goode ................... | B65H 51/14 166/385 |

(Continued)

OTHER PUBLICATIONS

International Search Report and Written Opinion (PCT/US2014/037367), dated Sep. 16, 2014.

*Primary Examiner* — Blake Michener
(74) *Attorney, Agent, or Firm* — Lloyd L. Davis; Andrews Kurth Kenyon LLP

(57) ABSTRACT

An injector head unit includes one or more drive chains revolving within a common plane mounted on an upper drive sprocket and a lower drive sprocket, wherein at least one of the upper and lower drive sprockets are configured to move vertically to tension the drive chains, and at least one fixed reference point proximate to at least one of the upper and lower drive sprockets, wherein relative positioning of one of the movable upper and lower drive sprockets with the fixed reference point indicates to a user an amount of elongation of the drive chains after a certain period of time.

10 Claims, 7 Drawing Sheets

(56) References Cited

U.S. PATENT DOCUMENTS

| | | | |
|---|---|---|---|
| 6,332,501 B1 | 12/2001 | Gipson | |
| 6,719,043 B2 * | 4/2004 | Austbo | E21B 19/22 166/77.3 |
| 6,968,894 B2 * | 11/2005 | Austbo | E21B 19/22 166/77.3 |
| 2002/0046833 A1 * | 4/2002 | Perio, Jr. | E21B 19/22 166/77.3 |
| 2003/0209346 A1 * | 11/2003 | Austbo | E21B 19/22 166/77.2 |
| 2012/0247787 A1 | 10/2012 | Lancaster | |
| 2014/0124336 A1 * | 5/2014 | Domenicucci | B65G 43/02 198/810.02 |

* cited by examiner

CHAIN SERVICE INDICATOR

CROSS-REFERENCE TO RELATED APPLICATIONS

This application claims priority under 35 U.S.C. §119(e) to U.S. Provisional Application No. 61/821,439 filed May 9, 2013, which is incorporated herein by reference in its entirety.

FIELD

This invention relates to coiled tubing injector units. More particularly, this invention relates to a chain service indicator for coiled tubing injector units.

BACKGROUND AND SUMMARY

In the oil and gas industries, coiled tubing refers to metal piping used for interventions in oil and gas wells and sometimes as production tubing in depleted gas wells. Available in sizes ranging from 1 inch to 4.5 inches, coiled tubing strings are carried on reels and injected into a wellbore using a coiled tubing injector unit. A typical coiled tubing injector unit 5 is illustrated in FIG. 1. The typical unit includes a goose-neck support 3, a rotary transmission assembly, parallel drive chains 7 carrying gripping insert assemblies, skates and a hydraulic system. (The transmission assembly, gripping insert assemblies, skates and hydraulic system are not shown in detail in FIG. 1). Those skilled in the art are familiar with the components and operation of the unit 5 illustrated in FIG. 1.

The series of gripping insert assemblies carried by the chains provide the sole direct support for holding the coiled tubing in place or moving the tubing. The gripping insert assemblies are arranged in opposing pairs to secure the coiled tubing string between the injector-head chains. The hydraulic system applies pressure to the skates which in turn force the gripping insert assemblies toward each other thereby securing the coiled tubing between the gripping insert assemblies. Additionally, the hydraulic drive system drives the chains to feed the coiled tubing string into the well or pull the tubing out of the well.

During operation, wear between various components of the injector head may cause the drive chains to become elongated. Once the drive chains have become elongated by a certain amount, they are typically replaced to prevent failure. Unfortunately, it is difficult to know an exact amount by which the drive chains have elongated. Of course, the drive chains may be measured, but this requires stopping entirely any operation for which the injector head was currently being used.

Sometimes, the drive chains may be measured while they are still in the injector head. This is difficult because other parts of the injector head may be in the way, such as chain guards and other components. Removing such components is time consuming, and reassembly of the removed components after measuring may be performed improperly. The other alternative is to remove the drive chain itself from the injector head to measure its length. However, this is even more time consuming and further exacerbates problems associated with incorrect reassembly. What's more, the measurement data, once obtained, must still be used to obtain a percentage by which the drive chains have elongated. Other alternatives for use during operation are "go no go" gauges, however these may only be capable of indicating a maximum amount by which the drive chain has elongated. What is needed then is a drive chain indicator that can quickly and accurately provide a percentage chain elongation during operation of the injector head unit.

In one aspect, embodiments disclosed herein relate to an injector head unit including one or more drive chains revolving within a common plane mounted on an upper drive sprocket and a lower drive sprocket, wherein at least one of the upper and lower drive sprockets are configured to move vertically to tension the drive chains, and at least one fixed reference point proximate to at least one of the upper and lower drive sprockets, wherein relative positioning of one of the movable upper and lower drive sprockets with the fixed reference point indicates to a user an amount of elongation of the drive chains after a certain period of time.

In another aspect, embodiments disclosed herein relate to an injector head unit including one or more drive chains revolving within a common plane mounted on an upper drive sprocket and a lower drive sprocket, wherein the lower drive sprocket is configured to move vertically to tension the drive chains, one or more fixed reference points proximate to the movable lower drive sprocket, and a reference point on the lower drive sprocket configured to move relative to the one or more fixed reference points, wherein relative positioning between the lower drive sprocket reference point and the fixed reference points indicates to a user an amount of elongation of the drive chains during operation.

In yet other aspects, embodiments disclosed herein relate to a method of measuring elongation of drive chains of an injector head unit, the drive chains mounted on an upper drive sprocket and a movable lower drive sprocket and configured to revolve within a common plane, the method including providing a reference point movable with one of the drive sprockets and one or more fixed reference points proximate to the movable drive sprocket, operating the injector head unit, and determining by relative positions of the movable and fixed reference points, and without stopping operation of the injector head unit, an amount of elongation of the drive chains.

BRIEF DESCRIPTION OF THE DRAWINGS

The invention is illustrated in the accompanying drawings wherein.

DETAILED DESCRIPTION

Figure 1:
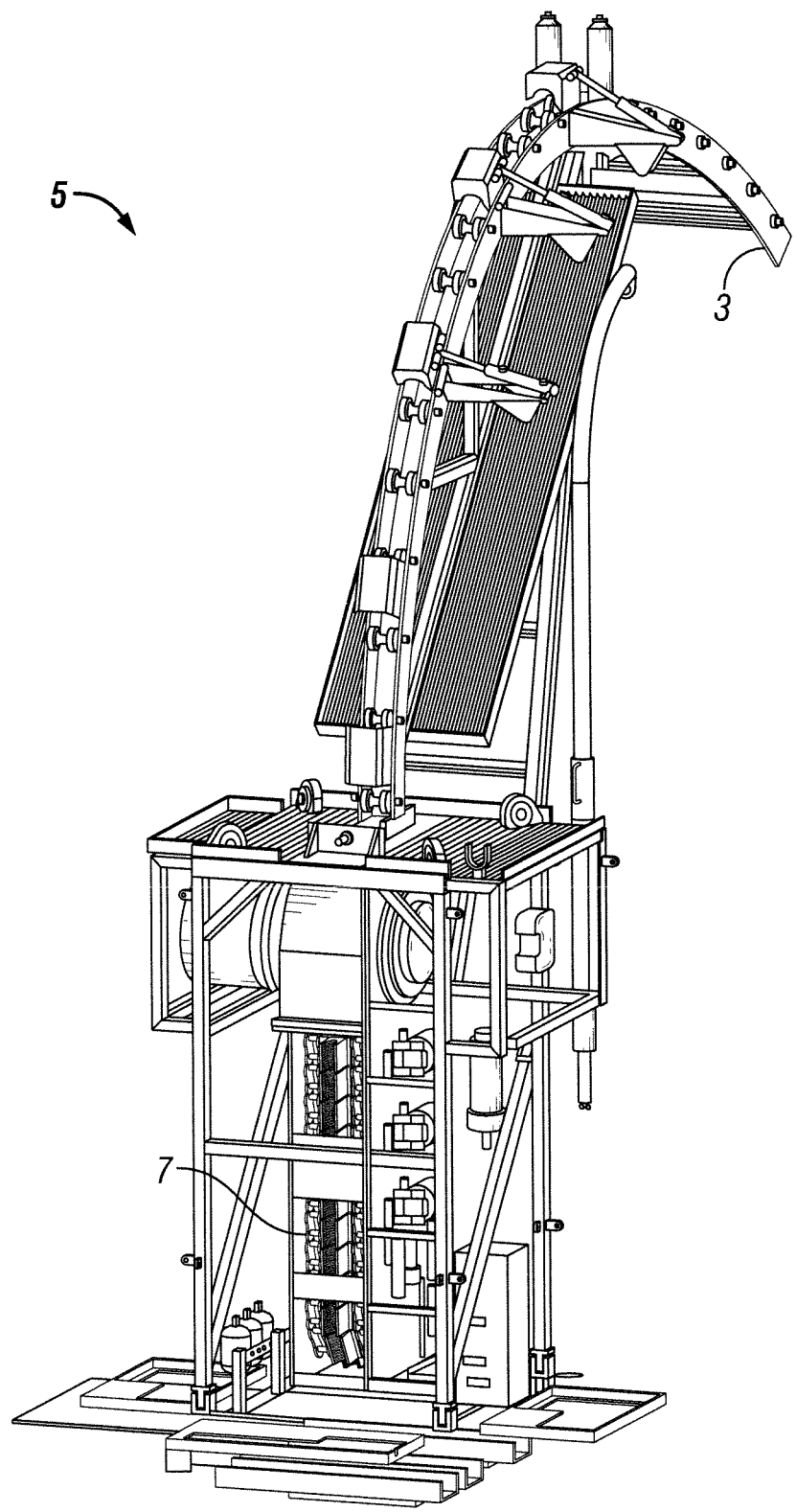
FIG. 1 is a perspective view of a coiled tubing injector unit.
Figure 2:
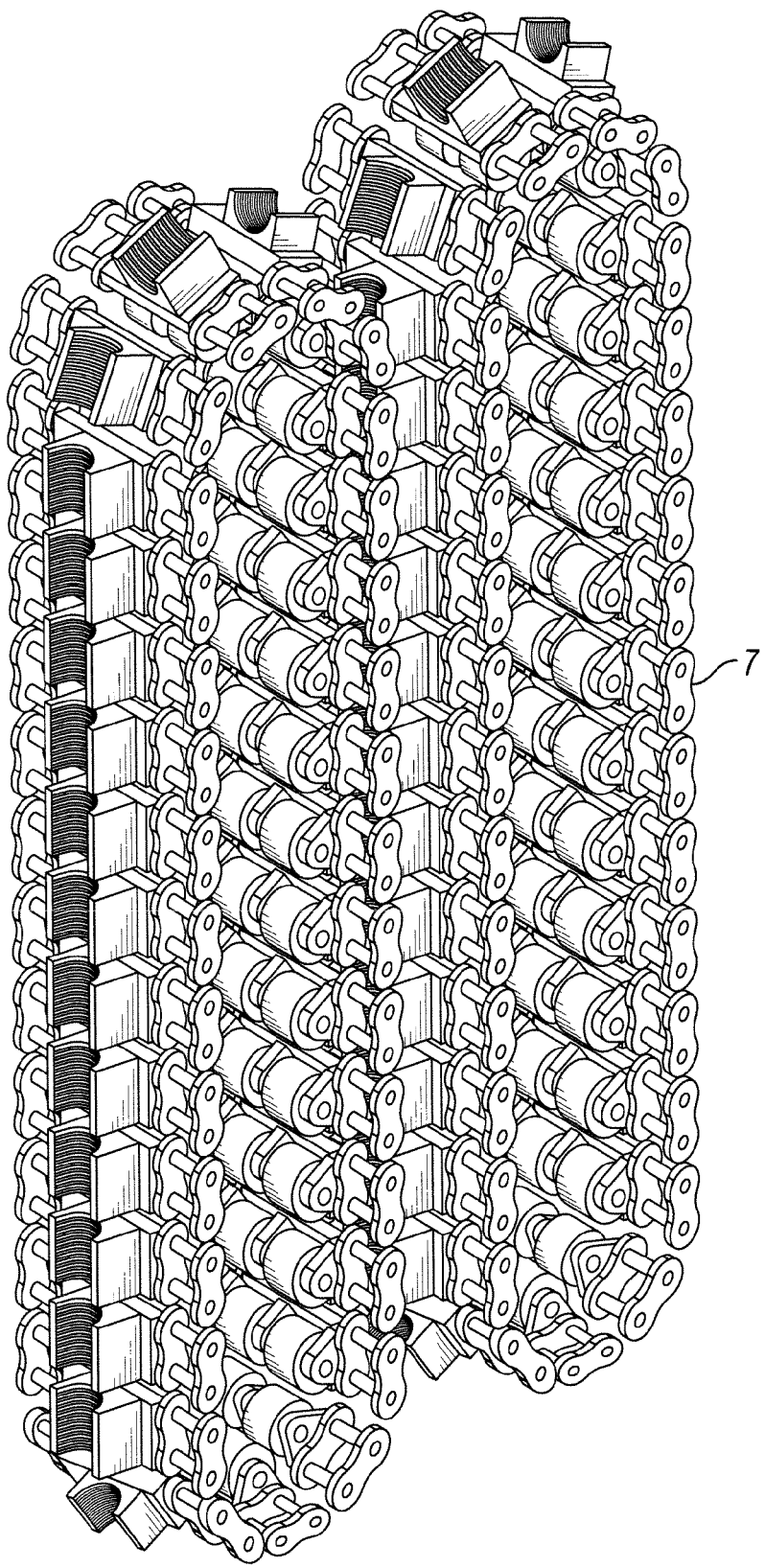
FIG. 2 illustrates a drive chain assembly component of FIG. 1.

The aspects, features, and advantages of the invention mentioned above are described in more detail by reference to the drawings, wherein like reference numerals represent like elements.

Figure 3B:
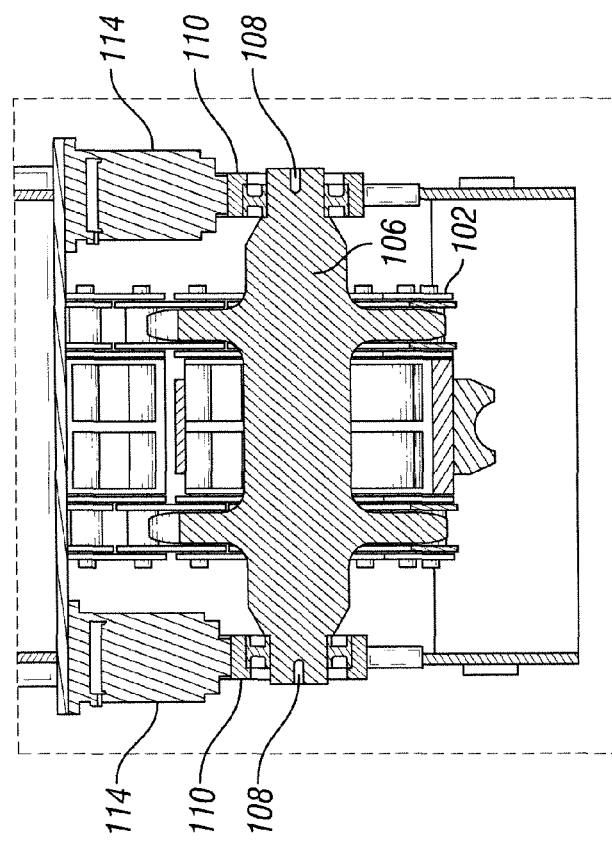
FIG. 3B illustrates an enlarged cross-section view of the injector head of FIG. 3A.
Figure 3A:
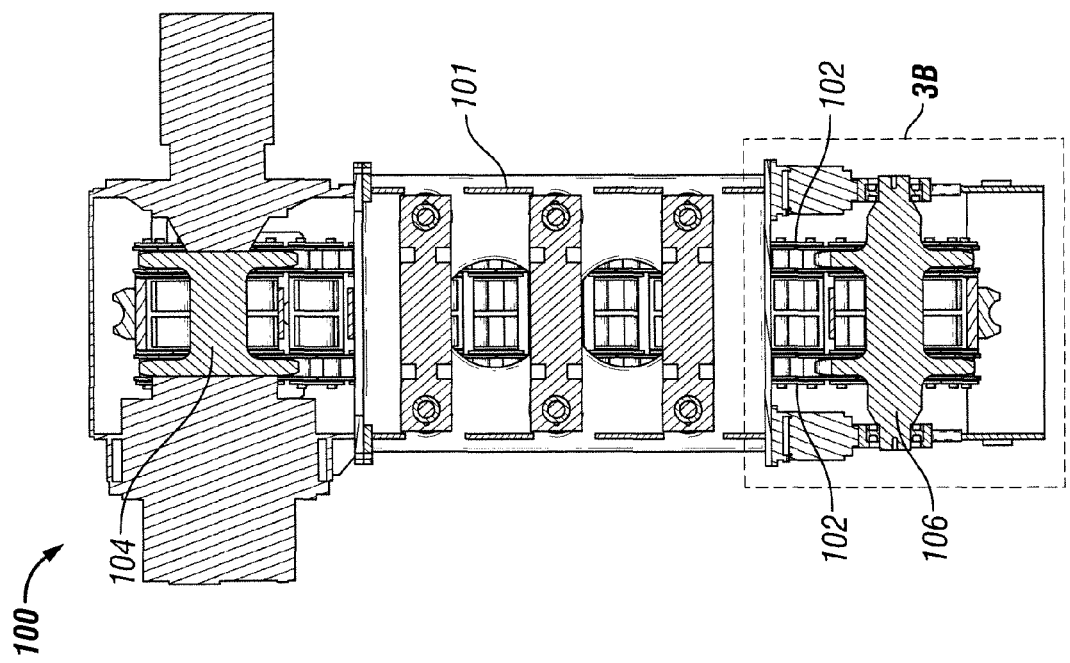
FIG. 3A illustrates a cross-section view of an injector head.

FIGS. 3A-B illustrate cross-section views of an injector head 100 in accordance with one or more embodiments of the present disclosure. A box-shaped frame 101 is formed from two, parallel plates (e.g., a front plate and a rear plate), separated by a first side plate (not shown) and a second side plate (not shown) parallel to the first side plate. The frame 101 supports two, continuous loop drive chains 102 arranged in a conventional, opposing relationship that generally revolve within a common plane. The drive chains 102 carry one or more gripper inserts (not shown). Each drive chain 102 is mounted on an upper drive sprocket 104 and a lower drive sprocket 106. One set of bearings for the shafts of the upper drive sprocket 104 are mounted within an upper bearing housing (not shown).

Figure 4:
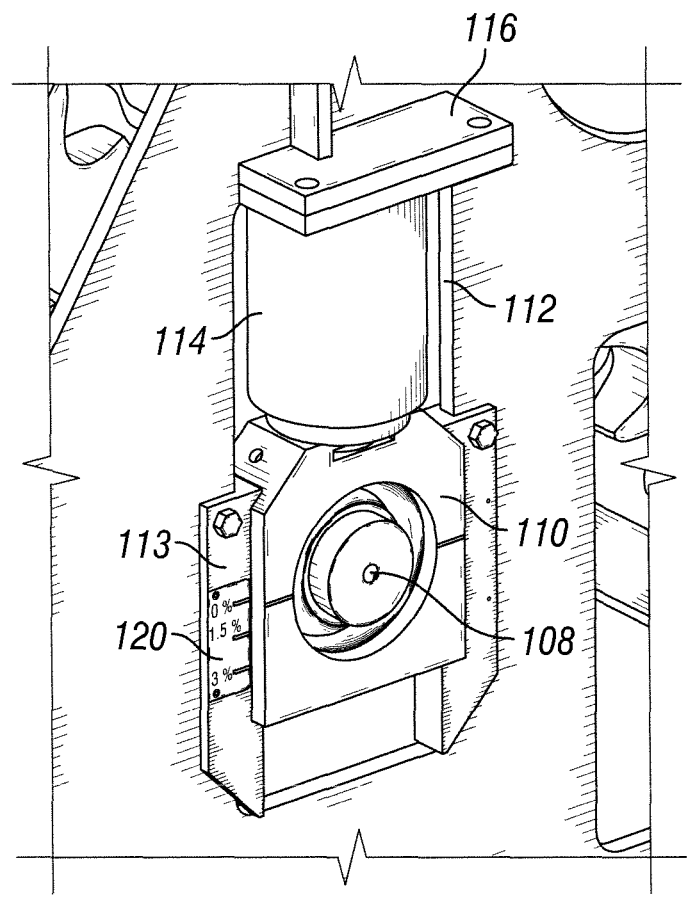
FIG. 4 is a perspective view of a chain tension system and elongation indicator in accordance with one or more embodiments disclosed herein.

Referring to FIGS. 3B and 4, the lower drive sprocket 106 includes end shafts 108, the ends of which are journalled on opposite sides of the injector frame 101 within movable carrier or bearing housings 110. Each bearing housing 110 is mounted so that it may slide vertically within an elongated slot 112 defined in either the front plate or rear plate of the frame 101. A bearing housing guide 113 may be mounted in the elongated slot 112. A hydraulic cylinder 114 is inserted between the top of each bearing housing 110 and a block 116 connected to the frame 101 at the top of each elongated slot 112. Each cylinder 114 applies a spreading force between the stationary block 116 and the movable bearing housing 110 to push down on the lower drive sprockets 106 and thus tension the drive chains 102. One of ordinary skill in the art will be familiar with the amount of hydraulic pressure exerted by the cylinder 114 for proper tensioning of the drive chains 102.

Figure 5B:
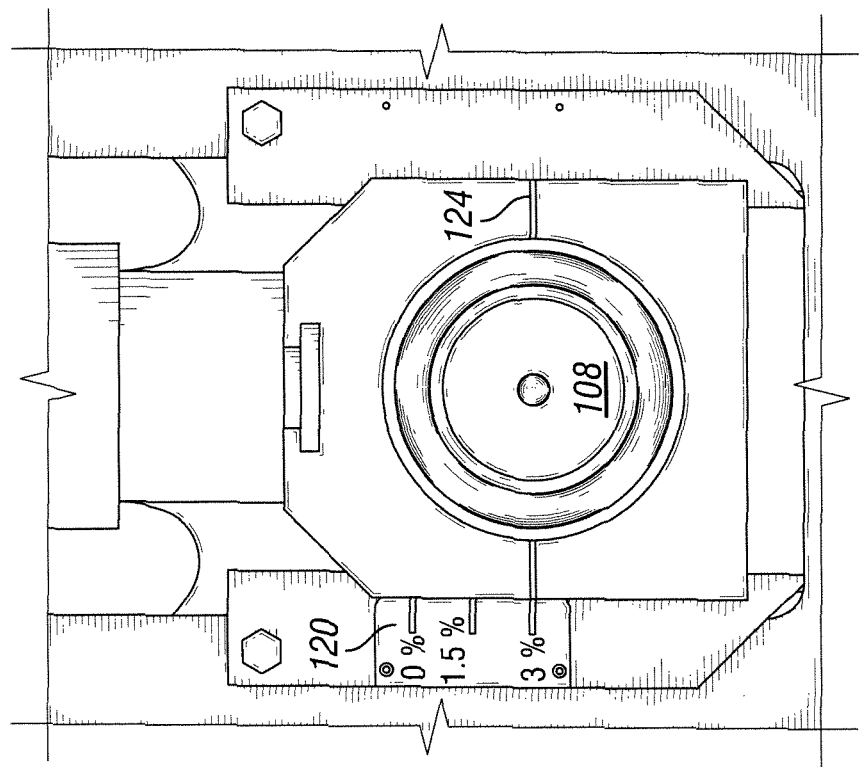
FIG. 5B illustrates a worn or elongated condition of the drive chains.
Figure 5A:
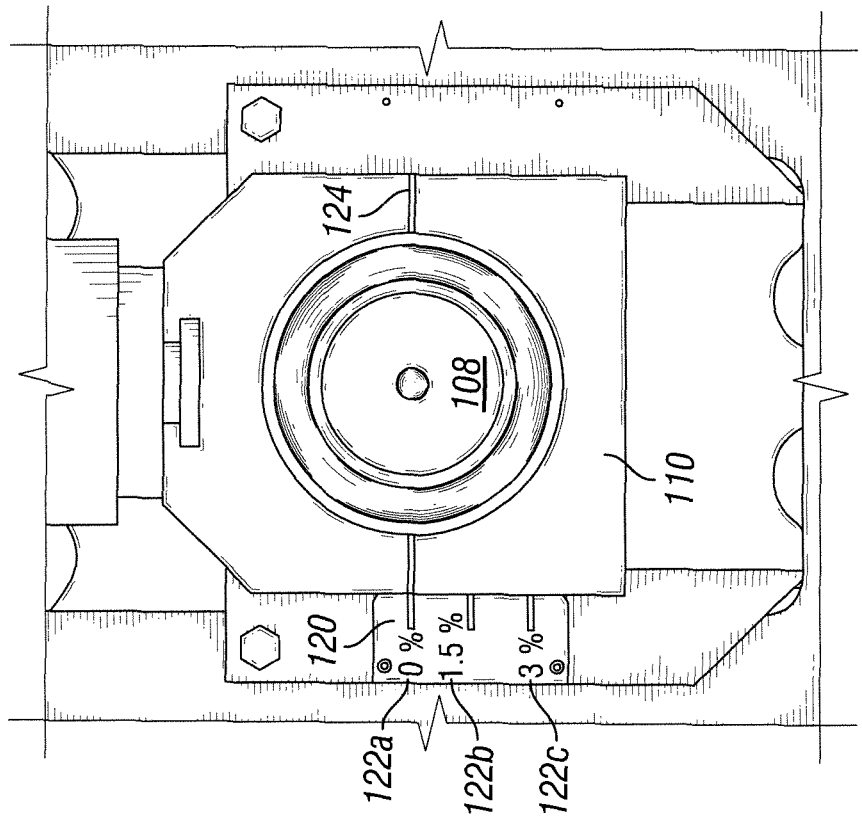
FIG. 5A illustrates an initial condition of the drive chains.

Referring to FIGS. 5A-B, a chain service indicator 120 is shown on the bearing housing guide 113. The chain service indicator 120 may be a separate panel or thin plate that is attached to the bearing housing guide 113. For example, rivets or threaded fasteners may be used to attach the chain service indicator 120 to the bearing housing guide 113. Alternatively, the chain service indicator 120 may be integrally formed on the bearing housing guide 113, such as by etching, either mechanically or chemically, stamping, painting, or other methods known to one of ordinary skill in the art. Alternatively, the chain service indicator 120 may be located at any fixed location on the frame 101 or other components of the injector head unit 100.

As shown, the chain service indicator 120 includes gauge markings 122a, 122b, 122c spaced equally apart from one another. In alternative embodiments, gauge markings may be unequally spaced. As shown, the gauge markings 122a, 122b, 122c indicate percentages, e.g., "0%," "1.5%," and "3%" respectively, corresponding to a percentage elongation of the drive chain relative to an original or initial drive chain length. Stated otherwise, the percentages indicate an amount by which the drive chains have elongated during use of the injector head unit 100. For example, gauge marking 122a indicates that the drive chain is elongated by 0% (e.g., the drive chain is new or nearly new). Gauge marking 122b indicates that the drive chain has experienced up to about 1.5% elongation relative to its original chain length. Gauge marking 122c indicates that the drive chain has experienced up to about 3% elongation relative to its original chain length. 3% elongation is considered maximum elongation of the drive chains. In other embodiments, maximum elongation may be at least about 5% elongation, 7% elongation, or up to 10% elongation, or greater. In other embodiments, absolute gauge markings may be used in place of relative percentages shown in the figures.

In other embodiments, any number of gauge markings may be included on the chain service indicator 120. For example, four or more gauge markings may be included depending upon the level of accuracy and number of indicators an operator would prefer. Alternatively, a single gauge marking indicating a maximum amount of chain elongation may be shown, or two gauge markings may be shown. One of ordinary skill in the art will understand that any number of gauge markings, numerical scales, and levels of accuracy may be used on the chain service indicator in accordance with one or more embodiments of the present disclosure.

Further, a reference 124 may be located on the movable bearing housing 110. The reference 124 is located substantially vertically in line with a center of the shaft end 108 of the lower drive sprocket 106. The reference 124 may be a horizontal line as shown in the figures, or alternatively may be a dot or other reference point that is readable by an operator. The reference 124 is calibrated with the gauge markings 122 to indicate elongation of the drive chains. Stated otherwise, alignment of the reference 124 with the one or more gauge markings 122a, 122b, 122c provides an amount of elongation of the drive chains.

For example, FIG. 5A shows the chain service indicator 120 which indicates 0% elongation at an initial condition. As the drive chains elongate, the hydraulic cylinder 114 is actuated to move the bearing housing 110 downward and apply tension to the drive chains 102. In turn, the reference 124 moves downward relative to the gauge markings 122, immediately indicating to an operator a percentage elongation of the drive chains 102. FIG. 5B illustrates a position of the reference line in relation to the gauge markings 122 indicating 3% elongation of the drive chains. Alternatively, the reference may be located on the frame 101 or bearing housing guide 113 and the gauge markings 122a, 122b, 122c may be located on the movable bearing housing 110. Accordingly, downward movement of the bearing housing 110 with the hydraulic cylinder 114 would move the gauge markings 122a, 122b, 122c relative to the reference on the bearing housing guide.

Figure 6:
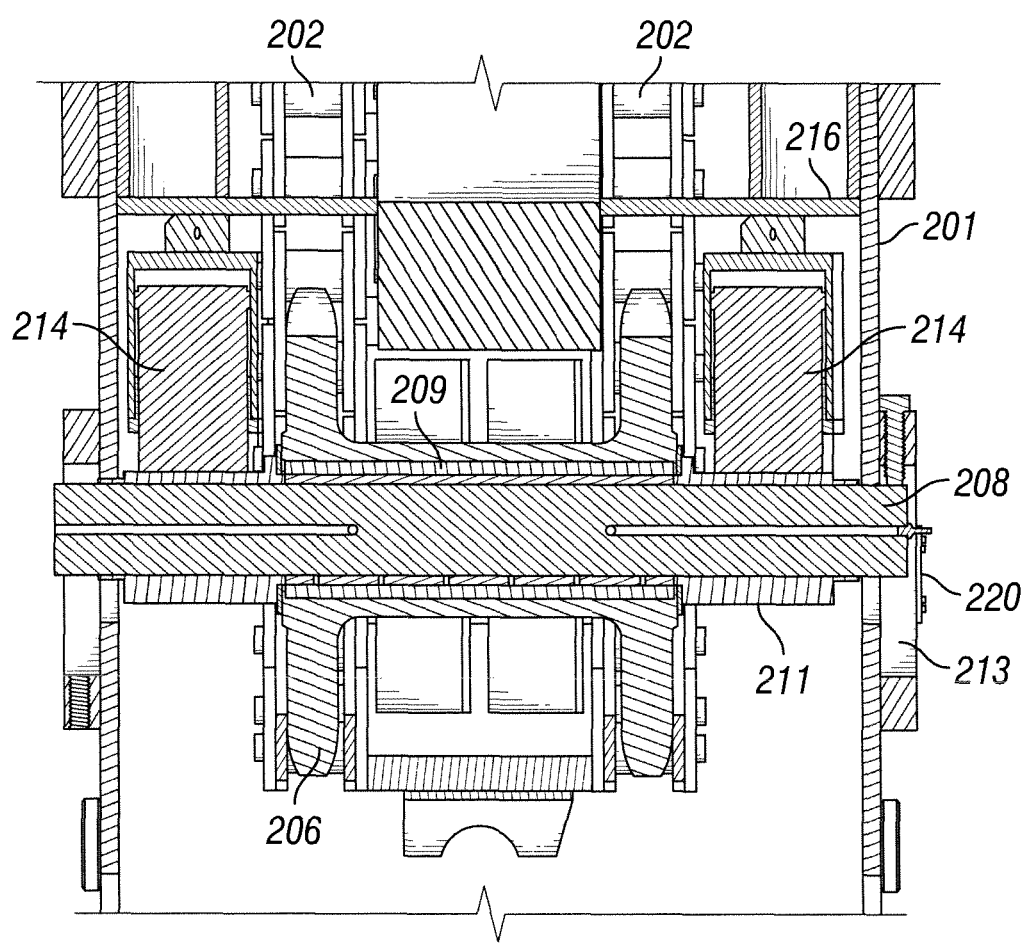
FIG. 6 illustrates a cross-section view of a lower drive sprocket and shaft in accordance with an alternate embodiment.
Figure 7:
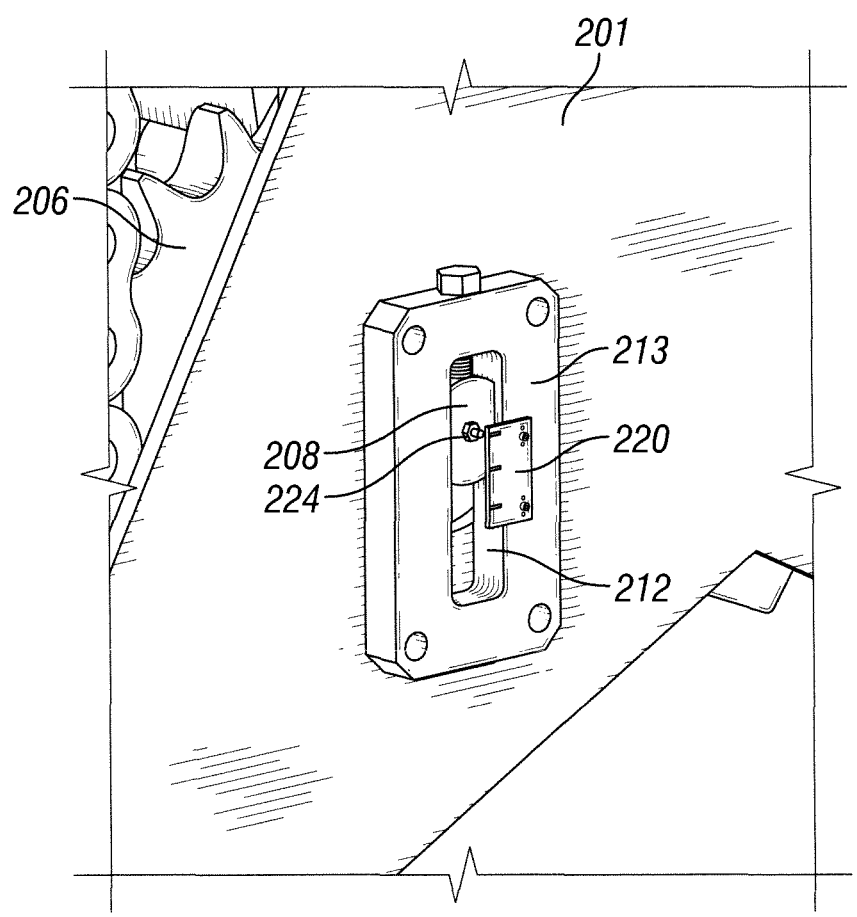
FIG. 7 illustrates a perspective view of a chain tension system and elongation indicator in accordance with an alternate embodiment.

Referring now to FIGS. 6 and 7, a chain service indicator 220 in accordance with one or more embodiments disclosed herein is shown. Referring to FIG. 6, one or more lower drive sprockets 206 are concentrically mounted on a shaft 208 extending there through. The sprockets 206 and 208 are separate components. A plurality of bearings 209 is arranged concentrically around substantially a central portion of the shaft 208 between an outer diameter of the shaft 208 and an inner diameter of the sprocket 206. The bearings 209 may be needle roller bearings, ball bearing, or other bearing types known to those skilled in the art. Ends of the shaft 208 are journalled on opposite sides of the injector frame 201 within an elongated slot 212 formed in a shaft guide 213. A hydraulic cylinder 214 is inserted above a sprocket shaft adaptor 211 and a block 216 connected to the frame 201. Each cylinder 214 applies a spreading force between the stationary block 216 and the movable adaptor 206 and shaft 208 to push down on the lower drive sprockets 206 and thus tension the drive chains 202. One of ordinary skill in the art will be familiar with the amount of hydraulic pressure exerted by the cylinder 214 for proper tensioning of the drive chains 202.

Referring to FIG. 7, a chain service indicator 220 is shown on lower sprocket shaft guide 213. The chain service indicator 220 may be a separate panel or thin plate that is attached to the shaft guide 213, or formed integrally therewith. As shown, the chain service indicator 220 includes gauge markings spaced equally apart from one another.

Further, a reference 224 may be located on the movable shaft 208. Other details and features of the chain service indicator 220 are alike to those previously described regarding chain service indicator 120, and therefore are not discussed further.

In one aspect, embodiments disclosed herein relate to an injector head unit comprising one or more drive chains revolving within a common plane and mounted within a frame on an upper drive sprocket and a lower drive sprocket, a movable bearing housing through which shaft ends of the lower drive sprocket extend and mounted within an elongated slot of the frame so that it may slide vertically, a cylinder coupled with the movable bearing housing that tensions the drive chains, a chain service indicator comprising one or more gauge markings proximate to the movable bearing housing, and a reference on the movable bearing housing, wherein alignment of the reference with the one or more gauge markings provides an amount of elongation of the drive chains.

In another aspect, embodiments disclosed herein relate to an injector head unit comprising one or more drive chains revolving within a common plane and mounted within a frame on an upper drive sprocket and a lower drive sprocket, a movable shaft extending through the lower drive sprocket, wherein ends of said shaft are mounted within an elongated slot of the frame so that said ends may slide vertically, a cylinder coupled with the movable shaft that tensions the drive chains, a chain service indicator comprising one or more gauge markings proximate to the movable shaft, and a reference on the movable shaft, wherein alignment of the reference with the one or more gauge markings provides an amount of elongation of the drive chains.

Advantageously, embodiments disclosed herein provide a chain service indicator that may be used during operation of the injector head unit and does not require stoppage of work being performed with the injector head unit. No special tools are required to measure elongation of the drive chains, nor are parts removed from the injector head unit for access to measure the drive chains. Further, the chain service indicator accurately and quickly provides an operator with a precise amount of drive chain elongation. Thus, the operator can know, or make an accurate prediction, regarding the expected remaining life of the drive chains. Also, the chain service indicator prevents failure of the drive chains due to excessive elongation, and allows an operator to replace the drive chains far prior to any failure. Accordingly, downhole operations are not interrupted due to measurements of the drive chain, or worse, failure of the drive chains due to excessive elongation.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. An injector head unit comprising:
    one or more drive chains revolving within a common plane mounted on an upper sprocket and a lower sprocket, wherein at least one of the upper and lower sprockets are configured to move vertically to tension the drive chains; and
    at least one fixed reference point proximate to at least one of the upper and lower sprockets, wherein the reference point indicates a percentage elongation of the drive chains relative to an original drive chain length, wherein relative positioning of one of the movable upper and lower sprockets with the fixed reference point indicates to a user an amount of elongation of the drive chains after a certain period of time thereby providing information regarding expected remaining life of the drive chains.

2. The injector head unit of claim 1, further comprising a movable bearing housing associated with one of the upper and lower sprockets.

3. The injector head unit of claim 2, further comprising a cylinder coupled with the movable bearing housing that tensions the drive chains.

4. The injector head unit of claim 1, further comprising a movable shaft extending through one of the upper and lower sprockets, wherein ends of the shaft are mounted within an elongated slot to move vertically.

5. The injector head unit of claim 1, wherein one of the upper and lower sprockets is concentrically mounted on a shaft extending therethrough.

6. The injector head unit of claim 5, wherein ends of the shaft of one of the upper and lower sprockets extend through an elongated slot in a shaft guide.

7. An injector head unit comprising:
    one or more drive chains revolving within a common plane mounted on an upper drive sprocket and a lower sprocket;
    a vertically movable bearing housing associated with the lower sprocket, and a hydraulic cylinder coupled with the movable bearing housing, wherein the hydraulic cylinder is configured to exert a downward vertical force on the lower sprocket to tension the drive chains;
    one or more fixed reference points proximate to the movable lower drive sprocket, wherein the one or more fixed reference points indicate a percentage elongation of the drive chains relative to an original drive chain length; and
    a reference point on the lower sprocket configured to move relative to the one or more fixed reference points, wherein relative positioning between the lower sprocket reference point and the fixed reference points indicates to a user an amount of elongation of the drive chains during operation thereby providing information regarding expected remaining life of the drive chains.

8. The injector head unit of claim 7, wherein multiple fixed reference points are equally spaced.

9. A method of measuring elongation of drive chains of an injector head unit, the drive chains mounted on an upper drive sprocket and a movable lower sprocket and configured to revolve within a common plane, the method comprising:
    providing a reference point on the movable lower sprocket and one or more fixed reference points proximate to the movable lower sprocket, wherein the fixed reference points indicate a percentage elongation of the drive chains relative to an original drive chain length;
    operating the injector head unit; and
    determining by relative positions of the movable and fixed reference points, and without stopping operation of the injector head unit, percentage elongation of the drive chains relative to an original drive chain length after a certain period of time, and thereby providing information regarding expected remaining life of the drive chains.

10. The method of claim 9, further comprising providing a hydraulic cylinder coupled to a movable bearing housing associated with the lower sprocket, and maintaining continual downward force with the hydraulic cylinder on the movable bearing housing to tension the drive chains.

* * * * *